June 18, 1935.  J. W. WEIR  2,005,062
METHOD OF DEWAXING OILS
Filed July 26, 1928
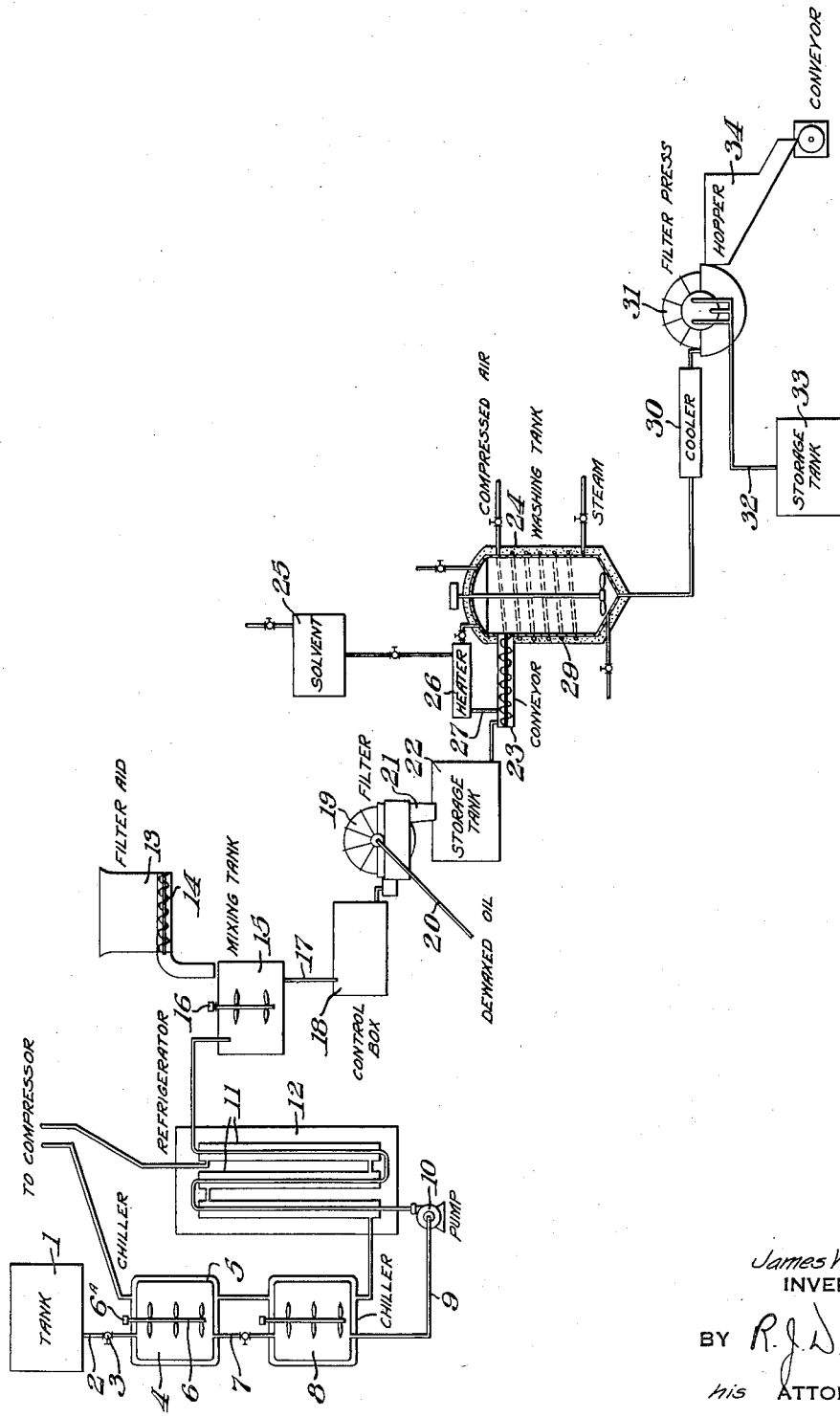
James W. Weir
INVENTOR
BY R. J. Dearborn
his ATTORNEY Patented June 18, 1935

2,005,062

UNITED STATES PATENT OFFICE 2,005,062

METHOD OF DEWAXING OILS

James W. Weir, Los Angeles, Calif., assignor, by mesne assignments, to The Texas Company, New York, N. Y., a corporation of Delaware Application July 26, 1928, Serial No. 295,464

12 Claims. (Cl. 196—18)

This invention relates to a method of dewaxing lubricating and other wax bearing oils for the purpose of lowering the cold test properties of the same.

In the previous Patent No. 1,509,325, granted to myself and William J. Ryan, September 23, 1924, we have described and claimed broadly the separation of wax from wax bearing oils by the use of a wax adherent medium of a flocculent nature, such as fuller's earth, kieselguhr, and filter-aid materials derived from diatomaceous earth or porous and cellular siliceous mineral deposits or the like, which facilitates the separation and congealing of the wax from the oil upon chilling of the same.

In said patent, the wax adherent medium is added to the oil before chilling and, during the chilling, the wax congeals upon the particles of the wax adherent medium forming crystals or globules of wax which lodge upon the filter surface during filtration while permitting the dilute chilled oil to flow through the filter surfaces freed from the wax.

My present invention contemplates the addition of filter-aid material or finely-divided solid granular material to wax-bearing oil after chilling and congelation of its wax constituents. The filter-aid material is mixed with the cold and congealed wax, and thereupon the resulting mixture of filter-aid material and solidified wax is separated from the oil.

The addition of the filter-aid or granular material to the cold mixture of oil and congealed wax facilitates the subsequent separation of the wax by filtration or otherwise.

I have found that with certain types of waxes, particularly those which solidify in an intermediate phase between the true amorphous and true crystalline wax, that the addition of the wax adherent medium or filter aid, after the chilling or solidification of the wax particles, causes the filter aid to coat the solid particles of the chilled wax and to serve as a separating medium between the particles of wax on the filter medium offering paths or cleavage planes between the particles of solid wax, through which the dilute oil may flow to separate it from the wax.

It is, therefore, an object of the present invention to provide a process for the dewaxing of oils in which the wax adherent medium is added to the oil after chilling of the same to coat and separate the solidified wax particles.

Another object of the invention is to improve the rate of filtration of certain chilled wax bearing oils.

Another object of the invention is to provide a process which is capable of handling a wider variety of oils and in which lower filtering pressure may be used.

Various other objects and advantages of the invention will appear as this description proceeds.

The accompanying diagrammatic drawing is illustrative of a typical plant layout for operating according to the process of this invention, but it is to be understood, however, that the use of the process is not confined to this particular structural layout.

In the drawing, the supply of diluted wax bearing oil is indicated at 1 and is provided with a gravity outlet 2 controlled by a valve 3 for charging the first chiller 4 which is jacketed for the circulation of cold brine or other refrigerant, as indicated at 5, and provided with an agitator 6 having a drive pulley 6a for circulating the oil.

From the chiller 4 the dilute oil flows through the pipe 7 to the second chiller 8 which is likewise brine jacketed and provided with an agitator.

The oil discharged from the chiller 8 flows through the pipe 9 to the pump 10 and is pumped through the coils 11 of the refrigerant chamber 12 while cold brine or other refrigerant flows through these coils in opposite direction from the compressor to the coils 11 and thence around the chillers 8 and 4 and back to the compressor.

A hopper 13 provided with a worm discharge feed 14 contains the wax adherent medium or filter aid, and is located to supply this material to the mixing tank 15 provided with an agitator 16, in which the wax adherent medium is mixed with the dilute chilled oil from the refrigerator 12 to coat the congealed wax particles therein.

After thorough mixing in the tank 16 the chilled oil with the particles of solidified or congealed wax coated with the wax adherent medium flows through the pipe 17 to the control box 18 which controls the feed of the mixture to the filter 19, which is preferably a continuous filter of the pressure or suction type well known to persons skilled in this art.

As the chilled oil mixed with the solidified wax and filter aid flows through the pores of the filter medium, the solid particle of wax and the filter aid are deposited on the filter surface with the filter aid between and separating the wax particles, permitting more rapid flow of the oil therethrough.

The wax freed oil is discharged through the pipe 20 to any desired point, where advantage may be taken of its low temperature to assist in the chilling of the incoming oil or the brine and the solid filter cake containing a mixture of wax and filter aid is scraped from the filter surface and dropped through the chutes 21 into the tank 22 wherein the wax may be separated and recovered, for example, by the use of a suitable wax solvent and heat as described in the previous Patent 1,509,325, the separated filter aid being returned to the tank 13 for reuse.

Reference may also be made to the drawing which illustrates in more detail the method of recovering the filter-aid material as described in the foregoing patent.

Thus, the solid wax and filter-aid material accumulating in the storage tank 22 may be conducted to a trough 23 provided with a conveyor screw and by which means it is introduced to a washing tank 24.

A suitable solvent or washing liquid is conducted from tank 25 to a heater 26. The solvent may be naphtha, alcohol or any other liquid capable of dissolving the wax or other congealed hydrocarbons. The heated solvent discharges through the tube 27 into the trough 23, the mixing being accomplished by the conveyor screw. If desired, the heated solvent may be discharged through the tube 28 directly into the washing tank 24 or the heated solvent may be discharged into both the trough and the tank.

Tank 24 is well insulated and may be provided with heating coils 29. The cake of wax and filter-aid material is dissolved by the heated solvent and the dissolving action is assisted by the stirring, mixing or agitation of the cake and solvent within the washing tank.

The mixture flows from the tank 24 to a cooler 30 wherein the mixture is reduced to the desired temperature, such temperature preferably being sufficiently low to prevent vaporization of the hydrocarbons. From the cooler 30, the cooled mixture is conducted to a filter 31. This filter separates the wax adherent medium from the liquid, the liquid being a mixture of the solvent and wax or other hydrocarbons.

The liquids flow from the filter through the pipe 32 to a storage tank 33 and the washing liquid or solvent is separated from the wax or other extracting hydrocarbons by any other well known methods of distillation and refining. The wax adherent medium forms a cake in the filter press and such cake is discharged into the hopper 34 from which it may be conducted to suitable storage means for reuse.

The term "diluted oil" as referred to in this specification will be understood to include any oil which remains fluid and pumpable at dewaxing temperatures, whether the diluent is contained in the oil in its natural state or is found therewith as a result of the manufacturing process or is artificially added thereto. A suitable diluent may comprise naphtha, alcohol or any other liquid suitable for lowering the cold test and viscosity, and decreasing the specific gravity of the hydrocarbons being treated, as disclosed, for example, in the above Patent 1,509,325.

Various modifications and changes may be resorted to in the detail steps of the process without departing from the spirit of my invention or the scope of the appended claims.

I claim:

1. The process of lowering the cold test of lubricating oils which consists in combining a diluent with lubricating oil stock containing wax, chilling the same to congeal the wax and adding thereto a comminuted wax adherent medium, the diluted stock other than the wax remaining liquid and then separating the chilled associated wax and wax adherent medium from the liquid mixture.

2. A process of lowering the cold test of lubricating oils which includes the operations of combining a diluent with lubricating oil stock, chilling the mixture thus produced to congeal the wax, adding a wax adherent medium to the chilled diluted stock, then separating the chilled associated wax and wax adherent medium from the liquid mass, then dissolving the wax that has been congealed from the wax adherent medium with a solvent and separating the wax solution from the wax adherent medium.

3. A process of lowering the cold test of lubricating oils which includes the operation of chilling the lubricating oil stock while the wax is dissolved therein to congeal the wax, adding a comminuted wax adherent medium, the stock other than the wax remaining liquid, separating the chilled associated wax and wax adherent medium from the liquid mass, then heating and dissolving with a suitable solvent the chilled associated wax, and finally separating the wax adherent medium from this solution whereby the wax adherent medium may be reused in a similar cycle of operations.

4. In the removal of wax from a diluted wax-containing oil, the improvement that comprises chilling the diluted oil then mixing the same while chilled with a finely divided granular material, and separating the oil from the wax and granular material.

5. The method of increasing the rate of filtration of a wax bearing oil wherein the wax is congealed by chilling, which comprises adding a filter aid to the chilled oil to separate the wax particles and passing the treated oil through a continuous filter.

6. The method of dewaxing oil which comprises chilling a diluted wax bearing oil mixture adding a wax adherent medium of the character of a filter-aid material including fuller's earth and kieselguhr to the chilled oil, passing the chilled oil through a filter to separate the wax and wax adherent medium from the oil and separating the wax from the wax adherent medium.

7. In the removal of wax from wax-containing oil the improvement that comprises chilling the oil, then mixing the same while chilled with a filter-aid material, and filtering the wax and filter-aid material from the oil.

8. The process of separating wax from wax-containing oil comprising chilling the oil to a temperature sufficient to precipitate wax therefrom, and removing said wax by filtration with the aid of finely-divided solid material adhering to and forming a coating on the particles of the precipitated wax said filter-aid material being added to the oil after chilling.

9. The process of removing from petroleum oil, wax which solidifies upon chilling in an intermediate phase between the true amorphous and true crystalline forms, comprising chilling said oil, mixing a finely-divided filter-aid material therewith, and filtering the oil from the wax and wax-adherent medium.

10. The process of removing wax from wax-containing oils comprising diluting said oil, chilling the diluted oil to a temperature sufficiently low to precipitate waxy constituents, adding to and agitating with the chilled oil a finely divided filter-aid material, and maintaining said low temperature while filtering the precipitated wax and the filter-aid material from the oil.

11. The process of separating wax from wax-containing oil which comprises chilling the oil to a temperature sufficient to precipitate wax therefrom, then mixing a finely-divided solid filter-aid material with the chilled oil whereby a suspension of precipitated wax and filter-aid material in oil is formed, and filtering the suspended wax and filter-aid material from the oil.

12. In dewaxing hydrocarbon oil by filtration, the method of increasing the rate of filtration of solid wax from a chilled mixture containing oil and solid wax which comprises adding a filter-aid material to the chilled mixture, and then passing the cold mixture through the filter wherein the solid wax and filter-aid material is separated from the oil in the form of a filter cake.

JAMES W. WEIR.